(12) United States Patent
Shinohara et al.

(10) Patent No.: US 10,870,377 B2
(45) Date of Patent: Dec. 22, 2020

(54) SOFT POLYURETHANE FOAM MOLDED ARTICLE AND SEAT PAD

(71) Applicant: BRIDGESTONE CORPORATION, Tokyo (JP)

(72) Inventors: Toshimitsu Shinohara, Tokyo (JP); Kosuke Yoshitomi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 545 days.

(21) Appl. No.: 15/316,988

(22) PCT Filed: Jun. 4, 2015

(86) PCT No.: PCT/JP2015/066190
§ 371 (c)(1),
(2) Date: Dec. 7, 2016

(87) PCT Pub. No.: WO2015/190392
PCT Pub. Date: Dec. 17, 2015

(65) Prior Publication Data
US 2017/0101040 A1    Apr. 13, 2017

(30) Foreign Application Priority Data
Jun. 12, 2014  (JP) ................. 2014-121917

(51) Int. Cl.
| | |
|---|---|
| *C08G 18/18* | (2006.01) |
| *B60N 2/64* | (2006.01) |
| *A47C 27/14* | (2006.01) |
| *A47C 7/18* | (2006.01) |
| *C08G 18/00* | (2006.01) |
| *B29C 39/00* | (2006.01) |
| *B29C 44/02* | (2006.01) |
| *B29C 44/58* | (2006.01) |
| *C08G 18/48* | (2006.01) |
| *C08G 18/76* | (2006.01) |
| *C08J 9/12* | (2006.01) |
| *C08J 9/228* | (2006.01) |
| *B29K 75/00* | (2006.01) |
| *B29K 105/00* | (2006.01) |
| *B29L 31/00* | (2006.01) |
| *C08G 101/00* | (2006.01) |

(52) U.S. Cl.
CPC ............... *B60N 2/64* (2013.01); *A47C 7/18* (2013.01); *A47C 27/14* (2013.01); *B29C 39/00* (2013.01); *B29C 44/02* (2013.01); *B29C 44/588* (2013.01); *C08G 18/00* (2013.01); *C08G 18/1825* (2013.01); *C08G 18/4854* (2013.01); *C08G 18/7671* (2013.01); *C08J 9/125* (2013.01); *C08J 9/228* (2013.01); *B29K 2075/00* (2013.01); *B29K 2105/0058* (2013.01); *B29L 2031/771* (2013.01); *C08G 2101/0008* (2013.01); *C08G 2101/0083* (2013.01); *C08J 2203/10* (2013.01); *C08J 2205/06* (2013.01); *C08J 2207/00* (2013.01); *C08J 2375/04* (2013.01)

(58) Field of Classification Search
CPC ........... A47C 7/18; A47C 27/14; B29C 39/00; B29C 44/02; B29C 44/588; B29K 2075/00; B29K 2105/0058; B29L 2031/771; B60N 2/64; C08G 18/00; C08G 18/1825; C08G 18/4854; C08G 18/7671; C08G 2101/0008; C08G 2101/0083; C08J 9/125; C08J 9/228; C08J 2203/10; C08J 2205/06; C08J 2207/00; C08J 2375/04
See application file for complete search history.

(56) References Cited

U.S. PATENT DOCUMENTS

| | | | |
|---|---|---|---|
| 4,350,390 A * | 9/1982 | Ogawa .............. | A47C 5/00 |
| | | | 297/452.18 |
| 6,103,149 A | 8/2000 | Stankiewicz | |
| 9,567,412 B2 * | 2/2017 | Yang ................ | C04B 26/10 |
| 9,956,729 B2 * | 5/2018 | Bianchi ............. | B29C 44/357 |
| 10,166,893 B2 * | 1/2019 | Takemoto .......... | A47C 7/18 |

FOREIGN PATENT DOCUMENTS

| | | |
|---|---|---|
| CN | 103275292 A | 9/2013 |
| JP | 5-331364 A | 12/1993 |
| JP | 11-35725 A | 2/1999 |
| JP | 11-80307 A | 3/1999 |
| JP | 2003284875 A | 10/2003 |
| JP | 2004-331772 A | 11/2004 |
| JP | 2005-97446 A | 4/2005 |
| JP | 2006-149466 A | 6/2006 |
| JP | 2006150090 A | 6/2006 |
| JP | 2009048067 A | 3/2009 |
| JP | 2010082721 A | 4/2010 |
| JP | 2012045104 A | 3/2012 |
| WO | 2017/082341 A1 | 5/2017 |

OTHER PUBLICATIONS

Communication dated Jun. 29, 2018, from the State Intellectual Property Office of People's Republic of China in counterpart Application No. 201580031030.1.

\* cited by examiner

*Primary Examiner* — John M Cooney
(74) *Attorney, Agent, or Firm* — Sughrue Mion, PLLC

(57) ABSTRACT

The present invention provides a soft polyurethane foam molded atticle which has a mounting surface (1A) can be obtained by foaming and molding a raw foaming liquid, and has a constitution which a ratio of a diameter of a foaming cell in the horizontal direction X along the mounting surface (1A) to a diameter of the foaming cell in the vertical direction Y orthogonal to the mounting surface (1A) increases toward the mounting surface (1A) in the vertical direction (Y).

6 Claims, 5 Drawing Sheets

SOFT POLYURETHANE FOAM MOLDED ARTICLE AND SEAT PAD

CROSS REFERENCE TO RELATED APPLICATIONS

This application is a National Stage of International Application No. PCT/JP2015/066190, filed on Jun. 4, 2015, which claims priority from Japanese Patent Application No. 2014-121917, filed on Jun. 12, 2014, the contents of all of which are incorporated herein by reference in their entirety.

TECHNICAL FIELD

The present invention relates to a soft polyurethane foam molded article and a seat pad.

BACKGROUND ART

In the related art, as soft polyurethane foam molded articles such as seat pads having a mounting surface, constitutions which hardness gradually increases from the surface on the mounting surface side toward the rear surface on the opposite side as described in, for example, Patent Document 1 are known.

In these soft polyurethane foam molded articles, foam having high hardness and foam having low hardness are provided in a mixed form using two kinds of raw foaming liquid developing mutually different hardnesses, whereby the hardness in the thickness direction of the soft polyurethane foam molded articles is continuously changed such that the hardness on the mounting surface side decreases.

DOCUMENT OF RELATED ART

Patent Document

[Patent Document 1] Japanese Unexamined Patent Application, First Publication No. 2006-149466

SUMMARY OF INVENTION

Technical Problem

However, in soft polyurethane foam molded articles in the related art, when a centrifugal force (centrifugal acceleration G) is exerted on a vehicle travelling on a curved path, changing lanes, or the like, there is a possibility that the lumbar part of people in the vehicle, mounted articles, and the like may lean in the horizontal direction and tremble.

In contrast, trembling can be prevented by increasing the viscoelasticity of soft polyurethane foam; however, in this case, there is a possibility that the cushioning property may be impaired.

The present invention has been made in consideration of the above-described circumstances, and an object of the present invention is to provide a soft polyurethane foam molded article and a seat pad which are capable of improving the stability by preventing trembling while maintaining a favorable seating feeling.

Solution to Problem

A soft polyurethane foam molded article according o the present invention is a soft polyurethane foam molded article which has a mounting surface and can be obtained by foaming id molding a raw foaming liquid, in which a ratio of a diameter of a foaming cell in the horizontal direction along the mounting surface to a diameter of the foaming cell in the vertical direction orthogonal to the mounting surface increases toward the mounting surface in the vertical direction.

Effects of Invention

According to the soft polyurethane foam molded article and the seat pad of the present invention, it is possible to improve stability by preventing trembling while maintaining a favorable seating feeling.

DESCRIPTION OF EMBODIMENTS

Hereinafter, an embodiment of a soft polyurethane foam molded article and a seat pad according to the present invention will be described with reference to the accompanying drawings.

Figure 1:
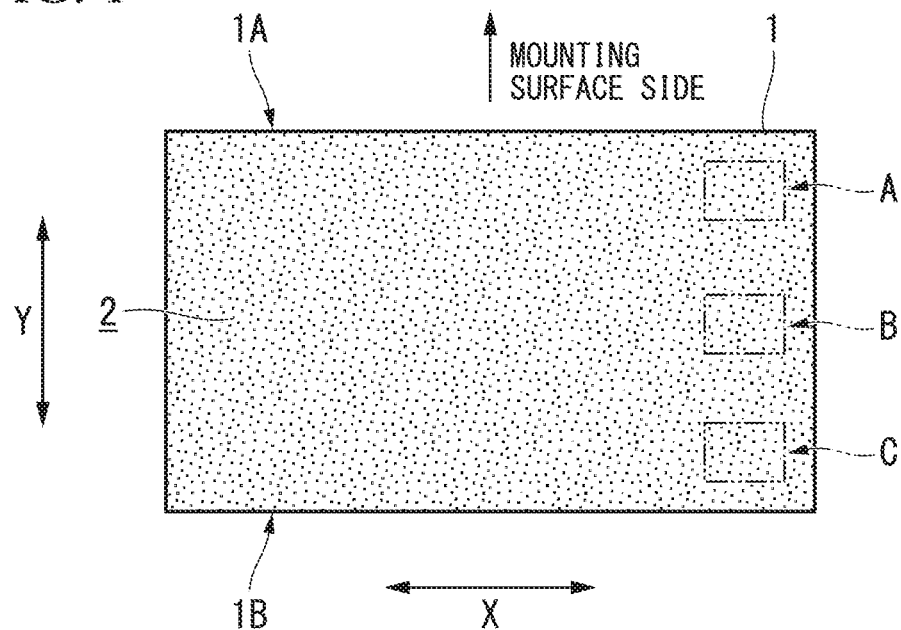
FIG. 1 is a vertical cross-sectional view showing a seat pad according to an embodiment of the present invention.

As shown in FIG. 1, a seat pad 1 of the present embodiment is a soft polyurethane foam molded article which is employed in, for example, seats (seating portions) and the like installed in automobiles (vehicles), has a seating surface 1A (mounting surface), and can be obtained by foaming and molding a raw foaming liquid 2.

For a number of foaming cells 21 in the seat pad 1, as shown in FIGS. 1, 2, 3A, 3B, and 3C, the ratio of a diameter Rx in the horizontal direction X along the seating surface 1A to a diameter Ry in the vertical direction Y orthogonal to the seating surface 1A(hereinafter, referred to as the aspect ratio) increases as the locations of the foaming cells approximate to the seating surface 1A in the vertical direction Y. Furthermore, the increase percentages of the aspect ratios in the vertical direction Y toward the seating surface 1A in the present seat pad 1 are identical. Meanwhile, the increase percentages being identical mean that the increase percentages are not only constant throughout the seat pad but also somewhat different in the vertical direction Y In addition, the foaming cells 21 in the seat pad 1 are pores in a soft foaming resin.

Here, the side opposite to the seating surface 1A in the vertical direction Y will be referred to as the rear surface 1B.

Soft polyurethane foam which can be obtained by foaming and molding, for example, a raw foaming liquid including a polyol component, a polyisocyanate component, a crosslinking agent, a foaming agent, and a catalyst as the raw foaming liquid in the seat pad 1 can be used, In the above-described raw foaming liquid 2, the gradation of the hardness may be developed by controlling the foaming behavior using one liquid (one blended) so as to change the aspect ratio, and the number of liquids is not limited to one, and the gradation of the hardness can also be developed by mixing two or more liquids (two blended).

Figure 2:
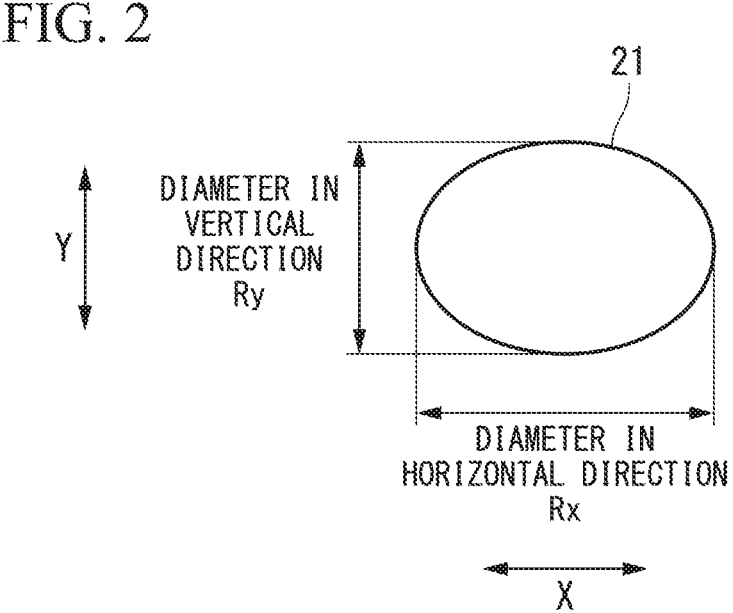
FIG. 2 is a view for describing an aspect ratio of a foaming cell in the seat pad.

The aspect ratio is, as shown in FIG. 2, a value obtained by dividing the diameter Rx of the foaming cell 21 in the horizontal direction X by the diameter Ry in the vertical direction Y and defines the shapes of cells in the seat pad 1.

Figure 3A:
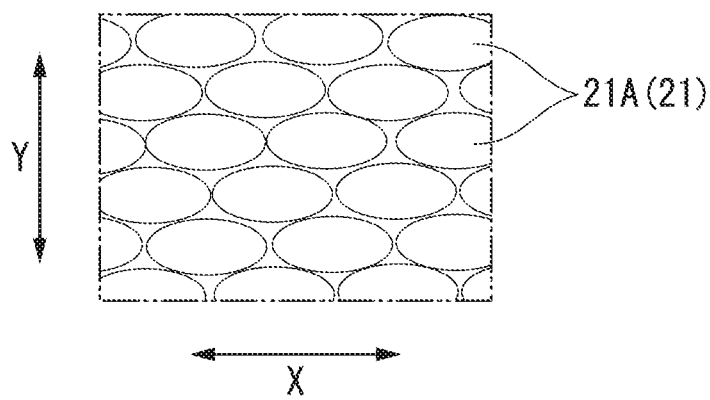
FIG. 3A is a cross-sectional view of a main portion of the seat pad and is an enlarged view of an A portion shown in FIG. 1.

In an A region on the seating surface 1A side of the seat pad 1 shown in FIG. 1, as shown in FIG. 3A, the aspect ratio is greater than 1, the diameter Rx in the horizontal direction X is larger than the diameter Ry in the vertical direction Y, and the foaming cells 21A have a flat shape that is long in the horizontal direction X. That is, the foaming cells 21A in the A region are easily deflected in the vertical direction Y and do not easily deform in the horizontal direction X. Therefore, the seat pad is felt soft as the cushioning property in the vertical direction Y.

Here, the aspect ratio of the foaming cell 21A included on the seating surface 1A side is preferably set in a range of 1.4 to 1.6. Meanwhile, this numerical value applies only to, among the foaming cells 21A included on the seating surface 1A side, foaming cells which are formed in portions that are not in contact with or close to the inner surfaces of a cavity C described below and can foam without any hindrance.

Figure 3B:
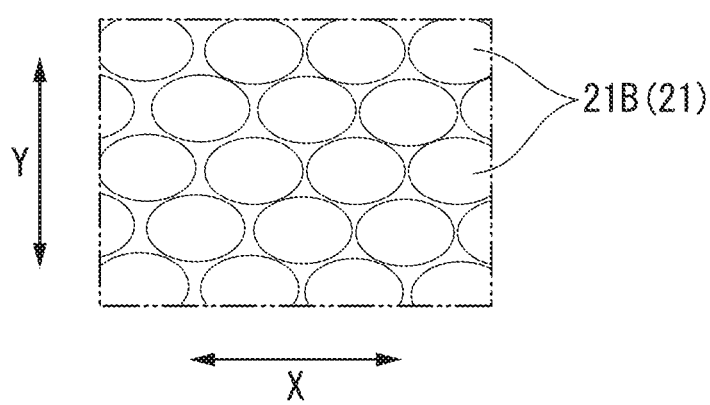
FIG. 3B is a cross-sectional view of a main portion of seat pad and is an enlarged view of a B portion shown in FIG. 1.

In addition, in a B region in the central portion in the vertical direction Y of the seat pad 1 shown in FIG. 1, as shown in FIG. 3B, the aspect ratio is greater than 1 and is a smaller value that the aspect ratio in the A region. Therefore, the diameter Rx in the horizontal direction X is slightly larger than the diameter Ry in the vertical direction Y, and foaming cells have a shape that is flattened so as to be slightly long horizontally compared with around shape. That is, the foaming cells 21B in the B region are not easily deflected in the vertical direction Y compared with the foaming cells 21A in the A region, and the seat pad is felt slightly hard as the cushioning property in the vertical direction Y.

Figure 3C:
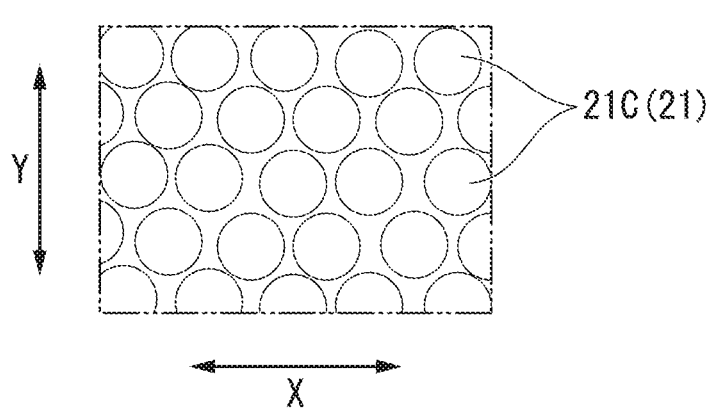
FIG. 3C is a cross-sectional view of a main portion of the seat pad and is an enlarged view of a C portion shown in FIG. 1.

In addition, in a C region in the central portion on the rear surface 1B side shown in FIG. 1, as shown in FIG. 3C, the aspect ratio is a value that is almost close to 1, and foaming cells have a round shape in which the diameter Rx in the horizontal direction X and the diameter Ry in the vertical direction Y are almost identical to each other. Specifically, the foaming cells have a horizontally long elliptical shape which has a smaller degree of flatness than those of the foaming cells 21B in the B region and is blocked in the vertical direction Y, and the foaming cells 21C in the C region do not easily deform on the basis of identical hardness with respect to forces in all directions compared with foaming cells 21A and 21B in the A and B regions, and the seat pad is felt hard.

Here, the aspect ratio of the foaming cell 21C included in the above-described C region is preferably set in a range of 0.95 to 1.05. Meanwhile, this numerical value applies only to, among the foaming cells 21C included on the rear surface 1B side, foaming cells which are formed in portions that are not in contact with or close to the inner surfaces of the cavity C described below and can foam without any hindrance.

In addition, the shapes of the foaming cells 21 gradually change from a horizontally long shape to a substantially round shape as the locations thereof move from the seating surface 1A toward the rear surface 1B as described above.

The sizes (volumes) of the foaming cells 21 at this time are smaller on the seating surface 1A side (the foaming cells 21A in the A region) and the rear surface 1B side (the foaming cells 21C in the C region) in the vertical direction Y than in the central portion (the foaming cells 21B in the B region) located therebetween.

Meanwhile, regarding the aspect ratios, the aspect ratios of the foaming cells 21 in individual portions obtained by equally dividing the seat pad 1 into multiple portions in the vertical direction Y increase from the seating surface 1A side toward the rear surface 1B side.

This aspect ratio can be specified on the basis of the ratio between the foaming cells 21 present in the horizontal direction X and an aggregate dividing these cells and the ratio between the foaming cells 21 present in the vertical direction Y and an aggregate dividing the foaming cells 21 in a predetermined region in each portion obtained by equally dividing the seat pad 1 into multiple portions in the vertical direction Y. Specifically, the aspect ratio can be specified on the basis of the ratio between the foaming cells 21 and the aggregate located on a straight line extending in the horizontal direction X and the ratio between the foaming cells 21 and the aggregate located on a straight line extending in the vertical direction Y which are obtained by means of image processing of optical photomicrographs.

Figure 4:
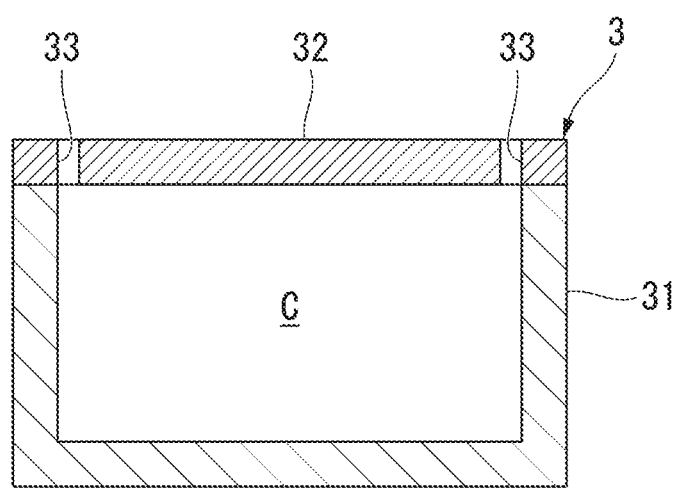
FIG. 4 is a vertical cross-sectional view of a molding die for manufacturing the seat pad.

Meanwhile, in a method for manufacturing the seat pad 1, a molding die 3 shown in FIG. 4 is used. This molding die 3 is formed in a box shape using a lower mold 31 and an upper mold 32, and the cavity C for forming the seat pad 1 is formed in the inner space of the molding die. The upper mold 32 is a lid material shielding the opening of the lower mold 31, and air vent holes 33 for venting the air in the molding die 3 are provided in the outer circumferential portion when seen in a planar view Here, an example of a method for measuring the aspect ratio will be described.

For example, an appropriate number of 20 mm×20 mm×20 mm cubes are cut out from a seat pad immediately below the hip point in accordance with the thickness thereof sequentially from the mounting surface (the front surface) toward the rear surface, thereby obtaining evaluation samples. For example, for a seat pad having a thickness of 95 mm, four evaluation samples are obtained, and, for a seat pad having a thickness of 75 mm, three evaluation samples are obtained.

In addition, an enlarged photograph of the central portion of each of the evaluation samples is obtained using an optical microscope, and vertical and horizontal lines passing through the center of the photograph are respectively considered as the vertical reference line and the horizontal reference line. Furthermore, vertical and horizontal lines are set at equal intervals of 2 mm from the vertical reference line and the horizontal reference line. Here, the vertical reference line and the horizontal reference line are also considered as the vertical and horizontal lines. Among the vertical lines, the vertical reference line and three vertical lines on both sides of the vertical reference line are used as measurement subjects. In addition, in a 6 mm-long range of each of the vertical lines having the intersection with the horizontal reference line as the center, the number of intersections between the skeletons of the foaming cells and the vertical line is visually counted, the counts from three vertical lines are averaged, and this average value is assumed as the diameter of the foaming cell in the vertical direction.

In addition, for the horizontal direction as well, similarly, among the horizontal lines, the horizontal reference line and three horizontal lines on both sides of the horizontal reference line are used as measurement subjects, in a 10 mm-long range of each of the horizontal lines having the intersection with the vertical reference line as the center, the number of intersections between the skeletons of the foaming cells and the horizontal line is visually counted, and the counts from three horizontal lines are averaged. This average value assumed as the diameter Rx of the foaming cell in the horizontal direction.

After that, the vertical and horizontal dimensions of the foaming cell are computed using Rx/Ry (the inverse of the average value, and the aspect ratio can be measured.

Meanwhile, the dimensions of the above-described evaluation samples (cubes), the intervals between the vertical and horizontal lines, the number of divided portions the count ranges (the lengths), and the like can be appropriately altered.

Figure 5:
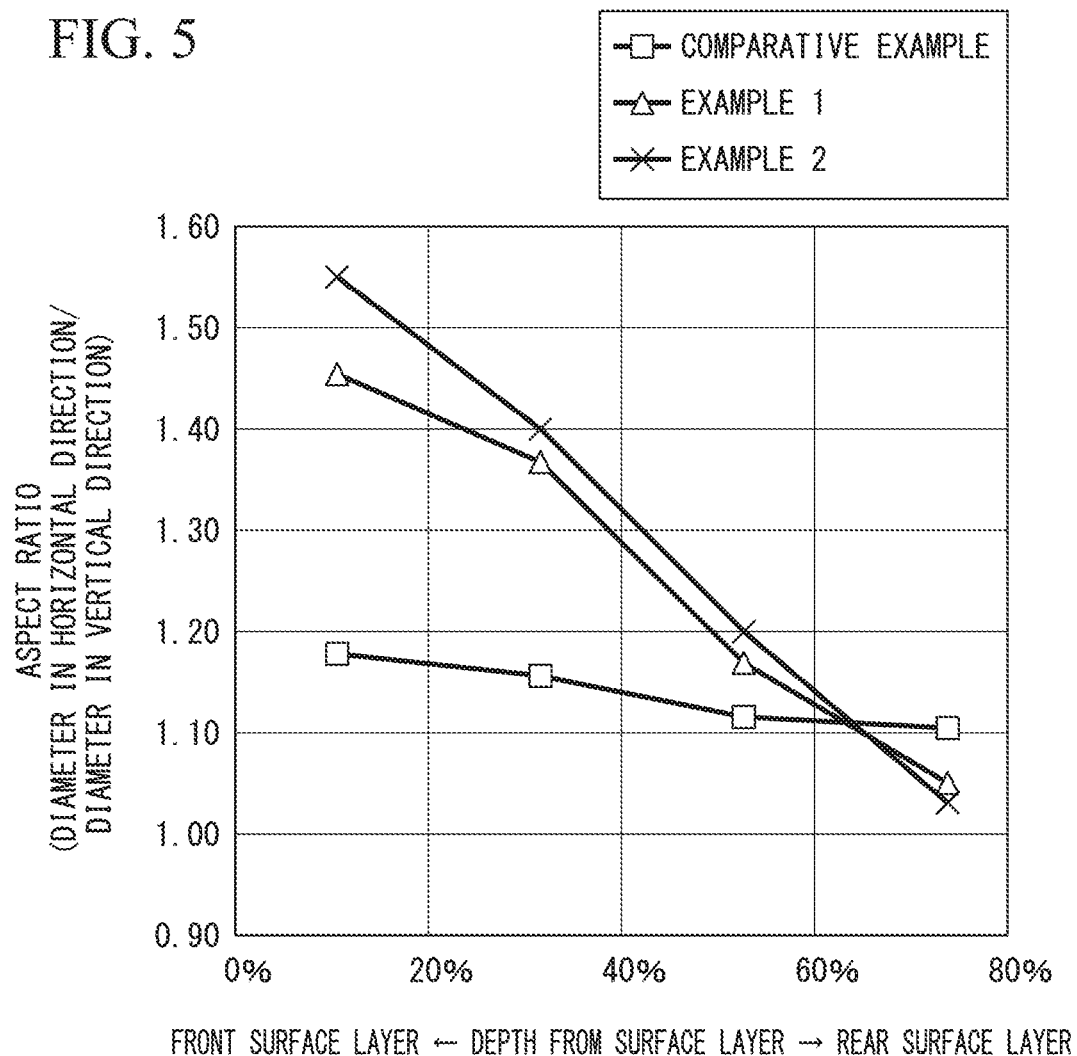
FIG. 5 is a graph showing aspect ratios of produced soft polyurethane foam in the thickness direction.

FIG. 5 shows an example of the results of the aspect ratios of the respective evaluation samples obtained using the above-described measurement method. FIG. 5 is a graph in which the horizontal axis indicates individual depth locations and the vertical axis indicates aspect ratios, the number of the evaluation samples is four, and the aspect ratios of seat pads produced on the basis of the conditions according to the present invention (Examples 1 and 2) and a comparative example as the related art are shown. Meanwhile, the formulations of soft polyurethane foam in the seat pads of Examples 1 and 2 and the comparative example are shown in Table 1 below. The aspect ratios in Example 1 are sequentially 1.45, 1.37, 1.17, and 1.05 from the front layer side toward the rear surface side, the aspect ratios in Example 2 are sequentially 1.55, 1.40, 1.20, and 1.03, similarly, from the front layer side toward the rear surface side, and the aspect ratios in the comparative example are sequentially 1.18. 1.16, 1.12, and 1.10, similarly, from the front layer side toward the rear surface side.

As shown in the graph of FIG. 5, the soft polyurethane foam in Examples 1 and 2 exhibits a tendency that a decrease percentage of the aspect ratios in the thickness direction from the front surface toward the rear surface is greater than that in the comparative example. According to the results of FIG. 5, it is found that, in Examples 1 and 2, since the aspect ratios near the front surface are relatively great, appropriate repulsive forces are generated when a passenger sits on the seat pad, and oppressive forces from the seating surface are small.

The approximate curves obtained from the aspect ratios in Examples 1 and 2 and the comparative example are respectively Y=0.668X+1.541 (Example 1), Y=−0.836X+1.647 (Example 2), and Y=−0.123X+1.190 (the comparative example). That is, since the slopes of the approximate curves are in a range of −0.85 to −0.60, it is possible to improve stability by preventing trembling while maintaining a favorable seating feeling, and the ride quality improves.

Here, specific soft polyurethane foam in the present embodiment will be described.

A preferred embodiment of the soft polyurethane foam is soft polyurethane foam obtained by foaming and molding a raw foaming liquid including a polyol component, a polyisocyanate component, a crosslinking agent, a foaming agent, and a catalyst. Materials constituting the above-described raw foaming liquid have the following characteristics (A) to (C).

(A) As the polyol component, a polyether polyol laving a weight-average molecular weight Mw in a range of 3,000 to 12,000 and the number of functional groups (the number of hydroxyl groups) of 3 or 4 is included.

(B) The molar ratio of ethylene oxide groups to propylene oxide groups in all of the compounds (the aggregate of the crosslinking agents) included in the raw foaming liquid as the crosslinking agent component or higher.

(C) As the polyisocyanate , 70 or more diphenylmethane diisocyanate (MDI) in terms of isocyanate equivalent is included.

<Polyol Component>

As the polyol component constituting the raw foaming liquid, a polyether polyol having a weight-average molecular weight Mw in a range of 3,000 to 12,000 and the number of functional groups (the number of hydroxyl groups) of 3 or 4 is included. The polyether polyol is preferably a polyether polyol obtained by means of the ring-opening polymerization of an alkylene oxide due to its favorable reactiveness. Examples of the alkylene oxide include propylene oxides (PO). ethylene oxides (EO), and the like. The number of alkylene oxides used as a material of the polyether polyol may be one or more.

The polyether polyol constituting the raw foaming liquid is preferably a polyether polyol obtained by jointly using PO and EO from the viewpoint of the raw material activity. The blending ratio (molar ratio) between PO and EO is not particularly limited, but is, for example, preferably 8/92 to 25/75 and more preferably 13/87 to 20/80. When the molar ratio of EO/PO is in the above-described range, it is possible to easily generate polyether polyols having favorable reactiveness.

The number of hydroxyl groups (functional groups) included in one molecule of the polyether polyol constituting the raw foaming liquid is preferably 3 or 4. When the number of hydroxyl groups is in the above-described preferred range, the viscosity of the raw foaming liquid becomes appropriate, and soft polyurethane foam having excellent properties can be obtained. Meanwhile, as arbitrary components, in addition to the above-described polyether polyol (A), polyether polyols having two functional groups may be jointly used.

The weight-average molecular weight Mw of the polyether polyol constituting the raw foaming liquid is preferably 3,000 to 12,000, more preferably 3,000 to 8,000, and still more preferably 5,000 to 8,000. When the weight-average molecular weight of the polyether polyol is 12,000 or lower, the viscosity of the raw foaming liquid does not increase excessively, and the stirring efficiency also becomes favorable. On the other hand, when the weight-average molecular weight of the polyether polyol is 3,000 or higher, soft polyurethane foam having favorable rebound resilience can be obtained. Here, the weight-average molecular weight Mw refers to a value computed as a polystyrene equivalent value by means of gel permeation chromatography (GPC). Meanwhile, as arbitrary components, in addition to the above-described polyether polyol (A), polyether polyols having a weight-average molecular weight of higher than 8,000 and 12,000 or lower may be jointly used.

The degree of unsaturation of the polyether polyol constituting the raw foaming liquid is preferably 0.03 milliequivalents/g or lower. When the degree of unsaturation is 0.03 milliequivalents/g or lower, soft polyurethane foam having favorable properties such as durability can be obtained. Here, the "degree of unsaturation" refers to the total degree of unsaturation (milliequivalents/g) measured using a method in which acetic acid freed by causing mercury (II) acetate to act on unsaturated bonds in a specimen is titrated with potassium hydroxide according to Japanese Industrial Standards JIS K 1557-1970.

The number of the polyether polyols included in the raw foaming liquid as the polyol component may be one or more.

In a case in which the number of the polyether polyols included in the raw foaming liquid as the polyol component is one, a polyether polyol having a weight-average molecular weight of 7,000 or higher and four functional groups (tetrafunctional) is preferably included. When the above-described polyether polyol is included, it is possible to significantly diminish the above-described trembling feeling generated in a case in which soft polyurethane foam obtained by means of foaming molding is used as seat pads.

Since desired properties are easily imparted to soft polyurethane foam obtained by foaming and molding the raw foaming liquid, the total amount of one or more polyether polyols corresponding to the polyether polyol (A) with respect to the total mass of the polyol component included in the raw foaming liquid is preferably 60% by mass or more, more preferably 70% to 100% by mass, still more preferably 80% to 100% by mass, and most preferably 85% to 100% by mass.

As the polyol component constituting the raw foaming liquid, in addition to the polyether polyol, a polymer polyol may be jointly used. As the polymer polyol, a polymer polyol that is ordinarily used for polyurethane foam molded articles can be applied. Examples thereof include polymer polyols obtained by graft-copolymerizing a polymer component such as polyacrylonitrile and acrylonitrile-styrene copolymers with a polyether polyol which is made of a polyalkylene oxide and has a weight-average molecular weight Mw of 3,000 to 8,000 and more preferably 4,000 to 7,000. The alkylene oxide which serves as a raw material of the polyalkylene oxide is preferably an alkylene oxide including a propylene oxide (PO) as a functional group (polymerizable group) and more preferably an alkylene oxide eluding only a propylene oxide or an alkylene oxide including both a propylene oxide and an ethylene oxide (EO). In addition, the amount of the polymer component with respect to the total mass of polymer polyol is preferably 25% to 50% by mass.

In a case in which a polyether polyol and a polymer polyol are mixed together as the polyol component constituting the raw foaming liquid, the mixing ratio (mass ratio) of the polyether polyol/the polymer polyol is preferably 70/30 to 99/1, more preferably 80/20 to 99/1, and still more preferably 85/15 to 99/1. When the mixing ratio is in the above-described range, soft polyurethane foam having desired properties can be easily obtained.

<Polyisocyanate Component>

As the polyisocyanate component constituting the raw foaming liquid, 70 or more diphenylmethane diisocyanate in terms of isocyanate equivalent is included.

A diphenylmethane diisocyanate (MDI) is a polyisocyanate component that is ordinarily used in the field of polyurethane foam. Specific examples of MDI include 4,4-diphenylmethane diisocyanate (4,4-MDI) which is generally called monomeric MDI, 2,4-diphenylmethane diisocyanate (2,4-MDI), 2,2-diphenylmethane diisocyanate (2,2-MDI), polymeric MDI, crude MDI, and the like. In the raw foaming liquid, one MDI may be included singly or two or more MDIs may be included.

The "isocyanate equivalent" representing the total amount of the polyisocyanate included in the raw foaming liquid refers to the molar ratio of isocyanate groups when the amount (moles) of active hydrogen in the raw foaming liquid is set to 100.

The isocyanate equivalent derived from MDI included in the raw foaming liquid is at least 70 or more, preferably 70 to 120, and more preferably 80 to 100. When the isocyanate equivalent is 70 or more, it is possible to prevent the e raw foaming liquid from being poorly stirred. When the isocyanate equivalent is 120 or less, it is possible to prevent foam from collapsing.

As arbitrary components, in addition to the MDI (C), a small amount of well-known polyisocyanate components other than MDI may be added thereto. Examples thereof include tolylene diisocyanate (TDI), triphenyl diisocynate, xyxlene diisocyanate, polymethylene polyphenylene isocyanate, hexamethylene diisocyanate, isophorone diisocyanate, and the like.

Since desired properties are easily imparted to soft polyurethane foam obtained by foaming and molding the raw foaming liquid, the total amount of one or more diphenylmethane diisocyanates (C) with respect to the total mass of the polyisocyanate component included in the raw foaming liquid is preferably 70% by mass or more, more preferably 80% to 100% by mass, still more preferably 90% to 100% by mass, and most preferably 95% to 100% by mass.

In addition, the amount of pure MDI constituting the diphenylmethane diisocyanate (C) with respect to the total mass of the polyisocyanate component included in the raw foaming liquid is preferably 40% by mass or more, more preferably 50% to 90% by mass, still more preferably 55% to 85% by mass, and most preferably 60% to 80% by mass.

<Crosslinking Agent Component>

In order for the soft polyurethane foam obtained by foaming and molding the raw foaming liquid to have desired properties, as the crosslinking agent component constituting the raw foaming liquid, a crosslinking agent having stronger reactiveness to the polyisocyanate component than water is preferably included as a main component. Generally, the reactiveness to the polyisocyanate component degrades in the order of glycerin, crosslinking agents having an ethylene oxide group (EO-based crosslinking agents), water, and crosslinking agents having a propylene oxide group (PO-based crosslinking agents). On the basis of what has been described above, the molar ratio between EO groups and PO groups (the molar number of EO groups/the molar number of PO groups) included in all of one or more compounds included in the raw foaming liquid as the crosslinking agent is preferably 100 or higher, more preferably 105 or higher, and still more preferably 110 or higher. This molar ratio is preferably higher. That is, the raw foaming liquid preferably does not substantially include crosslinking agents having PO groups.

Here, the ethylene oxide group (EO group) refers to a group having a monovalent bond which is obtained by removing one hydrogen atom constituting an ethylene oxide. The propylene oxide group (PO group) refers to a group having a monovalent bond which is obtained by removing one hydrogen atom constituting a propylene oxide.

As a specific crosslinking agent component, a well-known crosslinking agent that is used in the field of polyurethane foam can be applied. The molecular weight of the crosslinking agent is, generally, preferably 1,000 or lower. From the viewpoint of increasing the molar ratio of the EO groups/the PO groups, a commercially available crosslinking agent having "EO (groups)/PO (groups)=100/0" is preferred.

The number of crossing agents included in the raw foaming liquid may be one or more. In a case in which a crosslinking agent having a molar ratio of EO groups/PO groups of 100 or higher and glycerin are jointly used, the mass ratio between the crosslinking agent and glycerin is preferably 10:1 to 1:10, more preferably 5:1 to 1:5, and more preferably 2:1 to 1:2.

The total amount of the crosslinking component included in the raw foaming liquid is preferably 0.5 to 10 parts by mass and more preferably 1 to 5 parts by mass with respect to 100 parts by mass of the polyol component. When the total amount thereof is equal to or less than the upper limit value of the above-described range, the independent foaming property does not become excessively strong, molding becomes difficult, and collapsing of foam can be prevented. When the total amount thereof is equal to or more than the lower limit value of the above-described range, the effects of the crosslinking agent can be sufficiently obtained.

<Foaming Agent Component>

As the foaming agent component constituting the raw foaming liquid, water is preferably used. Since water reacts with a polyisocyanate and thus generates carbon dioxide, water functions as a foaming agent.

The content of water in the raw foaming liquid is preferably 1 to 7 parts by mass and more preferably 2 to 5 parts by mass with respect to 100 parts by mass of the polyol component. When the mount of water is in the above-described range, soft polyurethane foam having desired properties can be easily obtained. In addition, it is possible to prevent the thermal compression residual strain characteristics of the obtained soft polyurethane foam from deteriorating.

<Catalyst Component>

As the catalyst component constituting the raw foaming liquid, a well known catalyst that is used in the field of polyurethane foam is used. Examples of the well-known catalyst include amine-based catalysts and tin catalysts.

Generally, well-known catalysts are roughly classified into gelling catalysts that accelerate the resinification of polyurethane and blowing catalysts that accelerate the foaming of the polyisocyanate component.

A preferred gelling catalyst is a tertiary amine catalyst that particularly accelerates the reaction between a polyisocyanate and a polyol and is not particularly limited, and examples thereof include triethylenediamine. 1,8-diazabicyclo[5.4.0]undecene-7, imidazoles such as 1-methyl imidazole, 1,2-dimethyl imidazole, and 1-isobutyl-2-methyl imidazole, and 1,1'-(3-(dimethylamino)propyl)imino)bis(2-propanol). In addition, a preferred blowing catalyst is a tertiary amine catalyst that particularly accelerates the reaction between an isocyanate and water, effectively generates carbon dioxide, and is generally used to improve the fluidity of foam and dimensional stability. The blowing catalyst is not particularly limited, and examples thereof include bis(2-dimethylaminoethyl)ether, N,N,N',N",N"-pentamethyldiethylenetriamine, N,N,N',N",N"',N"'-hexamethyl triethylenetetramine, and the like.

The raw foaming liquid preferably includes, among the gelling catalysts and the blowing catalysts, at least a gelling catalyst as the catalyst component.

The mass ratio between the gelling catalyst and the blowing catalyst included in the raw filaming liquid is preferably 100:0 to 100:100, more preferably 100:0 to 100:50, and still more preferably 100:0 to 100:20.

The amount of 1,1'-(3-(dimethylamino)propyl)imino)bis(2-propanol) which is the gelling catalyst is preferably 0.1 to 2.0 parts by mass, more preferably 0.2 to 1.5 parts by mass, still more preferably 0.3 to 1.2 parts by mass, and particularly preferably 0.4 to 0.9 parts by mass with respect to 100 parts by mass of the polyol component. When the amount thereof is in the above-described range,soft polyurethane foam having desired properties can be easily obtained.

In a case in which 1,1'-(3-(dimethylamino)propyl)imino) bis(2-propanol) which is the gelling catalyst is jointly used with the blowing catalyst, the total amount of both catalysts is preferably 0.1 to 1.5 parts by mass, more preferably 0.4 to 1,2 parts by mass, and still more preferably 0.7 to 1.0 part by mass with espect to 100 parts by mass of the polyol component. When the amount thereof is in the above-described range, soft polyurethane foam having desired properties can be easily obtained.

In order to accelerate the resinification(gelation) reaction between polyols and polyisocyanates and accelerate the generation of urethane bonds, as the amine-based catalyst, a gelling catalyst having a ratio of the blowing activity to the gelling activity of $10 \times 10^{-1}$ or lower is preferably used.

Here, the gelling activity refers to a constant that determines the rate of the resinification reaction between polyols and polyisocyanates, and, as this value increases, the crosslinking density of foam increases, and thus the mechanical properties of the foam become more favorable. Specifically, the reaction constant of the gelation reaction between torylene diisocyanate and diethylene glycol is used. Meanwhile, the blowing activity refers to a constant that determines the rate of the foaming reaction between polyisocyanates and water, and, as this value increases, the communicating property of cells in foam enhances. Specifically, the reaction constant of the foaming reaction between torylene diisocyanate and water is used. The ratio between the two above-described catalyst constants represents the balance between both catalysts.

Examples of preferred amine-based catalyst will be exemplified below, also including specific examples of the gelling catalyst.

Specific examples of the gelling catalyst include not only the above-described catalysts but also triethylenediamine (TEDA), mixtures of triethylene diamine and polypropylene glycol, tertiary amines such as N,N,N',N'-tetramethylethylenediamine, N,N,N',N'-tetramethylpropylenediamine, N,N,N',N",N"-pentamethyl-(3-aminopropyl)ethylenediamine, N,N,N',N",N"-pentamethyl dipropylenetriamine, N,N,N',N'-tetramethylguanidine, and 135-tris(N,N-dimethylaminopropyl)hexahydro-S-triazine, imidazoles such as 1-methylimidazole, 1,2-dimethyl imidazole, and 1-isobutyl-2-methylimidazole, additionally, N,N,N',N'-tetramethyl hexamethylenediamine, N-methyl-N'-(2-dimethylaminoethyl) piperazine, N,N'-dimethyl piperazine, N-methylpiperazine, N-methylmorpholine, N-ethylmorpholine, and the like.

The amount of the amine-based catalyst in the raw foaming liquid is preferably 0.1 to 0.4 parts by mass, more preferably 0.2 to 0.4 parts by mass, and still more preferably 0.3 to 0.4 parts by mass with respect to 100 parts by mass of the polyol component. When the amount thereof is 0.1 parts by mass or more, that is, the lower limit value or higher of the above-described range, collapsing of foam can be prevented. When the amount thereof is 0.4 parts by mass or less, that is, the upper limit value or lower of the above-described range, the generation of independent foam and the consequent occurrence of shrinkage can be prevented.

Specific examples of the tin catalysts include well-known organic tin catalysts such as stannous octoate, stannous laurate, dibutyltin dilaurate, dibutyltin malcate, dibutyltin diacetate, dioctyltin diacetate, and tin octylate.

The amount of the tin catalyst in the raw foaming liquid is preferably 0.01 to 0.5 parts by mass, more preferably 0.01 to 0.4 parts by mass, and still more preferably 0.01 to 0.2 parts by mass with respect to 100 parts by mass of the polyol component, <Foam Stabilizer Component>

A foam stabilizer may be added to the raw foaming liquid. As the foam stabilizer, a well-known foam stabilizer that is used in the field of polyurethane foam can be applied, and examples thereof include silicone-based foam stabilizers, anionic foam stabilizers, and cationic foam stabilizers. Examples of these foam stabilizers include foam stabilizers having a hydroxyl group at the molecular chain terminal.

The amount of the foam stabilizer in the raw foaming liquid is preferably 0.1 to 5 parts by mass, more preferably 0.2 to 3 parts by mass, and still more preferably 0.3 to 0.8 parts by mass with respect to 100 parts by mass of the polyol component. Generally, the effects of the foam stabilizer can be sufficiently obtained when the amount thereof is 5 parts by mass or less. In addition, when the amount thereof is 0.1 parts by mass or more, the stirring property between the polyol component and the polyisocyanate component improves, and soft polyurethane foam having desired properties can be easily obtained.

<Other Arbitrary Components>

A variety of additives can be blended into the raw foaming liquid as necessary. For example, a colorant such as a pigment, a chain extender, a filler such as calcium carbonate, a flame retardant, an antioxidant, an ultraviolet absorber, a light stabilizer, a conductive substance such as carbon black, an antibacterial agent, and the like can be blended thereinto. The amount of a variety of additive blended is appropriately adjusted depending on the use or purpose.

<Method for Producing Raw Foaming Liquid>

The method for producing the raw foaming liquid is not particularly limited, and examples thereof include preparation methods in which a mixture of the respective remaining components other than the polyisocyanate component (hereinafter, in some cases, abbreviated as "polyol mixture") is prepared, and then is mixed with the polyisocyanate component, thereby obtaining the raw foaming liquid.

In order to diminish the contact between water which is a foaming agent and the catalyst component, the polyol mixture is preferably prepared in the following manner: first, the catalyst component is mixed into the polyol component, then, the foam stabilizer component, the crosslinking agent component, and the arbitrary components as necessary are mixed thereinto, and, finally, water which is a foaming agent is mixed thereinto.

After that, in a step of foaming and molding soft polyurethane foam, the polyol mixture and the polyisocyanate component are mixed together, thereby preparing the raw foaming liquid.

The viscosity of the prepared polyol mixture liquid temperature of 25° C. is preferably 2,400 mPa·s or lower and more preferably 1,800 mPa·s or lower. When the viscosity thereof is in this preferred range, the stirring efficiency of the raw foaming liquid becomes favorable, and a sufficient amount of form can be uniformly obtained throughout the raw foaming liquid, whereby it becomes easy to obtain soft polyurethane foam (foam molded article) having desired properties.

The method for foaming and molding soft polyurethane foam using the raw foaming liquid is not particularly limited, and, for example, well-known methods in which the raw foaming liquid is injected into the cavity formed in a die and is foamed and molded can be applied.

In the above-described well-known methods, in order to prevent the respective components constituting the raw foaming liquid from being separated from each other, it is preferable to mix the respective components described above together so as to prepare a raw foaming liquid immediately before the injection of the raw foaming liquid into the cavity. The liquid temperature of the raw foaming liquid being injected is preferably 10° C. to 50° C., more preferably 20° C. to 40° C., and still more preferably 25° C. to 35° C. The temperature of the die is preferably 40° C. to 80° C. more preferably 50° C. to 70° C., and still more preferably 60° C. to 65° C. When the liquid temperature of the raw foaming liquid and the temperature of the die are in the above-described preferred ranges, appropriate foam can be obtained. Subsequent to foaming, the foam is cured and then released from the die, thereby obtaining target soft polyurethane foam. A well-known film exclusion treatment may be further carried out on the soft polyurethane foam obtained herein.

<Regarding Stiffness Distribution in Thickness Direction of Soft Polyurethane Foam>

Regardless of foaming and molding methods, the soft polyurethane foam according to the present invention has a tendency that the stiffness (hardness) increases in the thickness direction from the lower layer toward the upper layer during foaming and molding (that is, the upward direction along the vertical line). That is, the stiffness distribution in the thickness direction of the soft polyurethane foam according to the present invention exhibits a continuous increase tendency or a continuous decrease tendency. Here, the stiffness distribution exhibits an increase tendency in a direction from the lower layer toward the upper layer during the foaming and molding of the soft polyurethane foam, and the stiffness distribution exhibits a decrease tendency in a direction from the upper layer toward the lower layer during the foaming and molding of the same soft polyurethane foam.

The detailed mechanism of the soft polyurethane foam according to the present invention exhibiting the above-described stiffness distribution is not clear, but the combination of the respective components constituting the raw foaming liquid is considered as a cause therefor. Particularly, the fact that the main polymerizable group (reactive group) of the crosslinking component is the EO group, the amount of the PO group in the crosslinking agent component is not enough for the crosslinking effect to be substantially exhibited, MDI is included as a majority of the polyisocyanate component, and TDI is not or rarely included is considered as a significant cause. In addition, the fact that glycerin is included as the crosslinking agent component and the gelling catalyst is included as the catalyst component is also considered to significantly contribute to the exhibition of the above-described stiffness distribution.

In addition, when the soft polyurethane foam exhibiting the above-described stiffness distribution is cut in the thickness direction, the degree of the flatness of the foaming cell shapes appearing on the cross-section exhibits a tendency of gradual increase from the upper layer toward the lower layer during foaming and molding. That is, in soft polyurethane foam obtained by means of foaming and molding, there is a tendency that foaming cells located in the lower layer during foaming and molding are pressed in the direction of gravitational force and exhibit horizontally long flat shapes (elliptical shapes), foaming cells located in the intermediate layer have a relatively-alleviated degree of flatness and thus have roughly round shapes, and foaming cells located in the upper layer have a further-alleviated degree of flatness and thus have substantially round shapes. As described above, the change in the shapes of foaming cells appearing on the cross-section of the soft polyurethane foam in the thickness direction is considered to have a correlation with the above-described tendency of the stiffness distribution.

Meanwhile, the soft polyurethane foam according to the present invention "being soft" means that the soft polyurethane foam has hardness (stiffness) so as to deform to be recessed when a passenger presses the soft polyurethane foam with a finger or sits on the soft polyurethane foam.

In addition, as other soft polyurethane foam, it is possible to use soft polyurethane foam obtained by foaming and molding a raw foaming liquid including a polyol, a polyisocyanate a crosslinking agent, a foaming agent, and a catalyst in which a polyether polyol having a weight-average molecular weight Mw in a range of 3,000 to 12,000 and 3 or 4 functional groups is included as the polyol, the molar ratio of ethylene oxide groups/propylene oxide groups in all of the compounds included as the crosslinking agent is 100 or higher, a short-chain polyol having a weight-average molecular weight of 1,000 or lower is included as the crosslinking agent, and 70 or more of torylene diisocyanate in terms of isocyanate equivalent is included.

Next, the actions of a soft polyurethane foam molded article and a seat pad which are constituted as described above will be specifically described using the accompanying drawings.

In the seat pad 1 of the present embodiment, as shown in FIGS. 1, 3A, 3B, and 3C, the shapes of foaming cells change to become horizontally long in the vertical direction Y toward the seating surface 1A, and thus relatively horizontally long foaming cells 21 which are easily compressed and deformed in the vertical direction Y are located on the seating surface 1A side, and relatively vertically long foaming cells 21 which are not easily compressed and deformed in the vertical direction Y are located on the rear surface 1B side in the vertical direction Y.

Therefore, it becomes possible to make the hardness on the seating surface 1A side lower than the hardness on the rear surface 1B side, and, in a case in which this soft polyurethane foam molded article is mounted in a vehicle and is used as the seat pad 1 as described in the present embodiment, it is possible to prevent passengers from feeling the hardness when the passengers sit on the seat pad and maintain a favorable seating feeling.

Furthermore, when the ratio is gradually changed in the vertical direction Y, in the portion located between the seating surface 1A and the rear surface 1B in the vertical direction Y in the soft polyurethane foam molded article, it becomes possible to prevent the generation of places in which the hardness abruptly changes and prevent passengers from feeling discomfort when sitting on the soft polyurethane foam molded article.

In addition, since the horizontally long foaming cells 21 are easily compressed and deformed in the vertical direction Y, but are not easily sheared and deformed in the horizontal direction X in the above-described deformed state, it becomes possible to prevent the seating surface 1A side from being deformed in the vertical direction X, and it is possible to reliably prevent passengers or articles sitting on the seating surface 1A from trembling in the horizontal direction. Therefore, it is possible to stabilize passengers or articles on the mounting surface even in a case in which acceleration is applied to the passengers or articles in the horizontal direction.

In addition, when one urethane foaming material is used, it is possible to easily and highly accurately manufacture soft polyurethane foam molded articles which have the above-described aspect ratio and are capable of diminishing trembling in a case in which acceleration is applied in the horizontal direction while passengers or articles are mounted thereon.

In addition, when the aspect ratio of the foaming cell 21 on the rear surface 1B side is set in a range of 0.95 to 1.05, due to the aspect ratio becoming close to 1, it becomes difficult for the soft polyurethane polyurethane foam molded article to be deformed by forces in directions and it is possible to further diminish a trembling feeling.

Furthermore, when the aspect ratio of foaming cell on the seating surface 1A side is set in a range of 1.40 to 1.60, it is possible to prevent the seat pad 1 from being excessively deflected in the vertical direction Y when passengers sit on the soft polyurethane polyurethane foam molded article and obtain a preferred sitting feeling so that sitting passengers sitting on the seating surface 1A do not feel hardness.

In addition, in the present embodiment, since the increase percentages of the aspect ratios in the vertical direction Y toward the seating surface 1A become identical each other and do not abruptly change, it is possible to decrease the change in the hardness characteristics in the vertical direction Y of the seat pad 1 and further prevent a discomfort feeling when articles are mounted or passengers are sitting thereon.

As described above, in the soft polyurethane foam molded article and the seat pad according to the present embodiment, it is possible to improve stability by preventing trembling while maintaining a favorable seating feeling.

EXAMPLES 95 mm-thick seat pads for vehicles were manufactured by injecting a urethane-blended raw liquid prepared by mixing a polyol component-blended liquid having a formulation shown in Table 1 and an isocyanate component into a die and foaming and molding the urethane-blended raw liquid, and the hardness thereof was measured using the following measurement method and was evaluated as described below.

Here, Table 1 shows the formulations of Example 1 and a comparative example. Meanwhile, the formulation of Example 2 is identical to the formulation of Example 1.

TABLE 1

| Amounts | | Examples 1 and 2 | Comparative Example |
|---|---|---|---|
| Polyol | Polyether polyol (A1-1) | 100 | — |
| | Polyether polyol (A1-2) | — | 45 |
| | Polymer polyol (A2-1) | — | 45 |
| | Crosslinking agent (C-1) | — | 6.5 |
| | Crosslinking agent (C-2) | 1 | 3.5 |
| | Crosslinking agent (C-3) | 1 | — |
| | Catalyst (D-1) | 0.9 | — |
| | Catalyst (D-2) | — | 0.4 |
| | Catalyst (D-3) | — | 0.2 |
| | Catalyst (D-4) | — | 0.3 |
| | Foam stabilizer (E-1) | 0.4 | — |
| | Foam stabilizer (E-2) | — | 1 |
| | Foaming agent (F-1) | 3.3 | 2.4 |
| | Total (unit: parts by weight) | 106.6 | 104.3 |
| Isocyanate (unit: equivalent) | Polyisocyanate (B-1) | 84 | — |
| | Polyisocyanate (B-2) | — | 86 |

<Measurement of Hardness at Individual Depth Locations>

Hereinafter, the lower surface during foaming and molding will be considered as the front surface, and the upper surface during foaming and molding will be considered as the rear surface by inverting up and down during foaming and molding. This is because, in a case in which soft polyurethane foam is used as a seat pad, when the front surface side corresponding to the seating surface of the seat pad is soft, and the rear surface side which is the opposite side to the seating surface is hard, a stable sitting feeling can be easily obtained.

The hardness was measured by obtaining evaluation samples by cutting out 20 mm×20 mm×20 mm cubes from the seat pad at a position immediately below the hip point. Meanwhile, in Example 1, since the thickness of the seat pad was 95 mm, four evaluation samples were sequentially taken out from the mounting surface (the front surface) toward the rear surface. The four evaluation samples were named as a first evaluation sample for a cube at a depth of 10.5%, a second evaluation sample for a cube at a depth of 31.6%, a third evaluation sample for a cube at a depth of 52.6%, and a fourth evaluation sample for a cube at a depth of 73.7% in a case in inch the front surface was defined to be at a depth of 0% (the front layer) and the rear surface was defined to be at a depth of 100% in the thickness direction from the front surface seating surface) toward the rear surface.

After that, deflection under load was measured for the respective evaluation samples so as to measure the stress when the evaluation sample bent 25%, and the measure stress was considered as hardness.

<Hardness Ratio>

The average of the hardness values measured from the respective evaluation samples obtained from four different depth places, which had been measured above, was computed, and the hardness ratios to this average value at the respective places were computed. These hardness ratios mean the ratios of the hardness values at the respective places (the respective depth locations) to the average hardness of the foam molded article in the thickness direction. Regarding these results, FIG. 6 shows a graph in which the horizontal axis indicates the respective depth locations and the vertical axis indicates the hardness ratios.

The hardness ratios in Example 1 are 0.80, 0.88, 1.07, and 1.25 from the front layer side toward the rear si rface side, and the hardness ratios in the comparative example are 1.17, 0.96, 0.87, and 1.00, similarly, from the front layer side toward the rear surface side.

Figure 6:
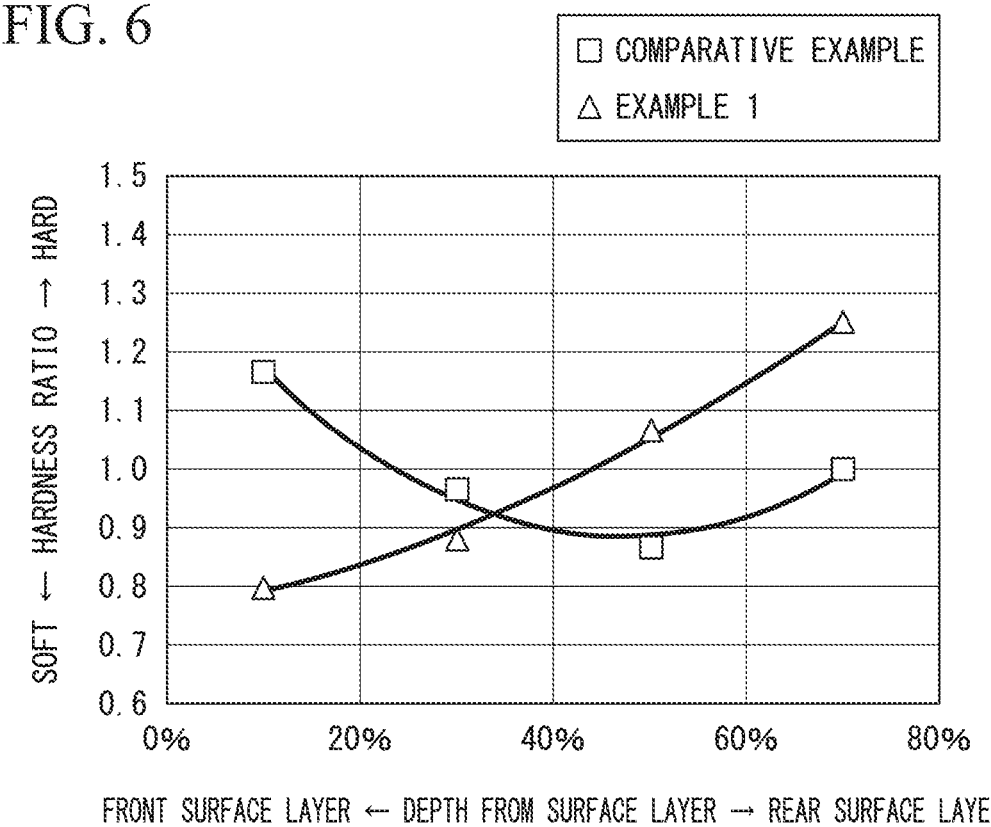
FIG. 6 is a graph showing stiffness distributions of the produced soft polyurethane foam in the thickness direction.

As shown in the graph of FIG. 6, in the soft polyurethane foam of Example 1, the hardness in the thickness direction from the front surface toward the rear surface continuously increases. That is, the stiffness distribution in the thickness direction exhibits a continuous increase tendency. As a result, a trembling feeling is sufficiently diminished, which is required in the seat pad use. In addition, since the hardness ratio near the front surface is relatively small, repulsive forces are appropriate when a passenger sits on the seat pad, and oppressive forces from the seating surface are small, and thus, unlike in the related art, a comfortable sitting feeling can be obtained.

The reason for the soft polyurethane foam of Examples 1 and 2 exhibiting the above-described stiffness distribution is considered as any one or more of the following facts that a large amount of glycerol is included in the raw foaming liquid for the soft polyurethane foam as the crosslinking agent, the EO-based crosslinking agent is included as the major crosslinking agent while the PO-based crosslinking agent is not substantially included, the gelling catalyst is the major catalyst, and a foam stabilizer is not substantially included.

On the other hand, in the soft polyurethane foam of the comparative example, as is clear from the graph of FIG. 6, the hardness ratio of the first evaluation sample at a depth of 10.5% near the front surface layer less decreases than the hardness ratio of the second evaluation sample at adept) of 31.6% which is located immediately below the first evaluation sample. When the above-described stiffness distribution is formed, in a case in which G in the horizontal direction is applied, a feeling of the soft polyurethane foam horizontally shifting in the intermediate layer deeper than the front layer that is near the seating surface is generated, and a trembling feeling is easily generated.

The reason for the soft polyurethane foam of the comparative example exhibiting the above-described stiffness distribution is considered as any one or more of the following facts that glycerol is not included in the raw foaming liquid for the soft polyurethane foam as the crosslinking agent, a large amount of the PO-based crosslinking agent is included as the crosslinking agent, and a large amount of the blowing catalyst is included as the catalyst.

Meanwhile, in Table 1, the details of the respective materials indicated by product numbers or names are as described below.

"Polyether polyol A1-1" has an EO/PO molar ratio of 16/84, a weight-average molecular weight of 7,000, and four functional groups.

"Polyether polyol A1-2" has an EO/PO molar ratio of 13/87, a weight-average molecular weight of 7,000, and three functional groups.

"Polymer polyol A2-1" is a 3.2-functional polymer polyol having a solid amount of 33%, a hydroxyl value of 23 mgKOH/g, and a weight-average molecular weight of 5,400 (manufactured by Sanyo Chemical Industries, Ltd., trade name: KC855).

"Crosslinking agent C-1" has an EO/PO molar ratio of 0/100, a weight-average molecular weight of 700, and three functional groups.

"Crosslinking agent C-2" has an EO/PO molar ratio of 100/0, a weight-average molcular weight of 400, and four functional groups.

"Crosslinking agent C-3" is glycerin.

"Catalyst D-1" is a commercially available gelling catalyst and 1,1'-(3-(dimethylamino)propyl)imino)bis(2-propanol).

"Catalyst D-2" is a commercially available gelling catalyst and triethylenediamine "Catalyst D-3" is a commercially available blowing catalyst and (2-dimethylaminoethyl)ether.

"Catalyst D-4" is a commercially available diethanolamine and catalyzes both resinification and foaming.

"Foam stabilizer E-1" is a low-activity-type silicone-based foam stabilizer manufactured by Evonik (trade name: B8734).

"Foam stabilizer E-2" is a high-activity-type silicone-based foam stabilizer manufactured by Evonik (trade name: B8742).

"Foaming agent F-1" is water.

"Polyisoeyanate (B-1)" is MDI-based isocyanate termed "FOAM LITE 1302B" manufactured by BASF INOAC Polyurethanes Ltd. A TDI-based isocyanate is not substantially included.

"Polyisocyanate (B-2)" is a commercially available polyisocyanate and is a TDI-based isocyanate in which TDI and MDI are mixed together at a mass ratio of 80/20.

Meanwhile, the technical scope of the present invention is not limited to the above-described embodiment and can be modified in various manners within the scope of the gist of the present invention.

For example, in the present embodiment, the soft polyurethane foam molded article applied as the seat pad 1, but the use thereof is not limited thereto, and the soft polyurethane foam molded article can be used for a variety of uses such as cushioning materials for indoor chairs and beds and cushioning materials for flooring in houses as well as seat pads in riding vehicles such as automobiles.

In addition, the soft polyurethane foam molded article may have a mounting surface not only for passengers to sit thereon but also for articles to be mounted. Therefore, the mounting surface does not necessarily need to be horizontal so as to be orthogonal to the vertical direction like the seating surface 1A in the present embodiment, and the direction of the mounting surface can be arbitrarily set such as vertical mounting surfaces.)

Additionally, it is possible to substitute the constituent elements in the above-described embodiment with well-known constituent elements within the scope of the gist of the present invention.

INDUSTRIAL APPLICABILITY

According to the soft polyurethane foam molded article and the seat pad of the present invention, it is possible to improve stability by preventing trembling while maintaining a favorable seating feeling.

REFERENCE SIGNS LIST 1 seat pad (soft polyurethane foam molded article)
1A seating surface (mounting surface)
1B rear surface
2 raw foaming liquid
21, 21A, 21B, 21C foaming cell
3 molding die
C cavity
Ry diameter of foaming cell in vertical direction
Rx diameter of foaming cell in horizontal direction
Y vertical direction
X horizontal direction

What is claimed is:

1. A soft polyurethane foam molded article which has a mounting surface and can be obtained by foaming and molding a raw foaming liquid,
    wherein a ratio of a diameter of a foaming cell in the horizontal direction along the mounting surface to a diameter of the foaming cell in the vertical direction orthogonal to the mounting surface increases toward the mounting surface in the vertical direction,
    a hardness of the soft polyurethane foam in a thickness direction from the mounting surface toward a rear surface opposite to the mounting surface continuously increases such that shapes of foaming cells gradually change from a horizontally long shape to a substantially round shape,
    increase percentages of the ratios in the vertical direction toward the mounting surface are identical to each other when the ratio is measured at four points in the soft polyurethane foam, the four points being set by equally dividing the soft polyurethane foam in the vertical direction, and
    the ratio of a region in a central portion in the vertical direction of the soft polyurethane foam between the mounting surface and the rear surface is smaller than the ratio of a region in a mounting surface side of the soft polyurethane foam and is greater than the ratio of a region in a rear surface side of the polyurethane foam.

2. The soft polyurethane foam molded article according to claim 1, wherein the raw foaming liquid is made of one urethane foaming material.

3. The soft polyurethane foam molded article according to claim 1,
    wherein the ratio of a diameter of a foaming cell in the horizontal direction along the mounting surface to a diameter of the foaming cell in the vertical direction orthogonal to the mounting surface included on a rear surface side opposite to the mounting surface side is 0.95 to 1.05.

4. The soft polyurethane foam molded article according to claim 1,
    wherein the ratio of a diameter of a foaming cell in the horizontal direction along the mounting surface to a diameter of the foaming cell in the vertical direction orthogonal to the mounting surface included on the mounting surface side is 1.40 to 1.60.

5. A seat pad,
    wherein the seat pad is installed in automobiles and used as a seating portion and is the soft polyurethane foam molded article according to claim 1.

6. The soft polyurethane foam molded article according to claim 1, wherein raw foaming liquid is made of one liquid which is one blended.

* * * * *